Figure 7:
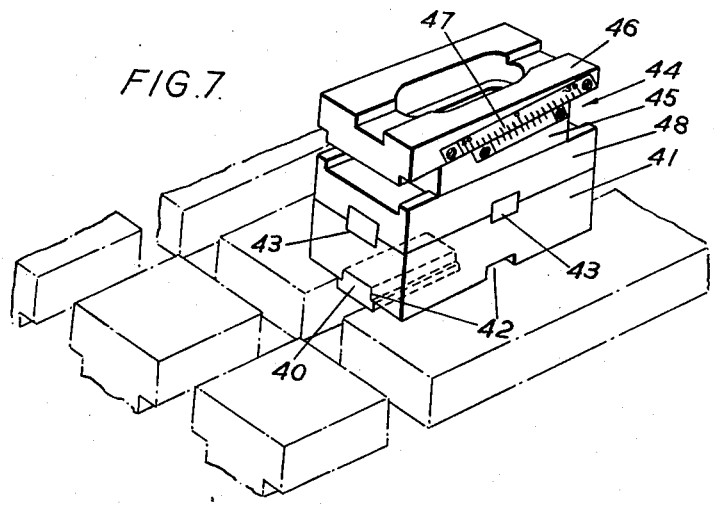

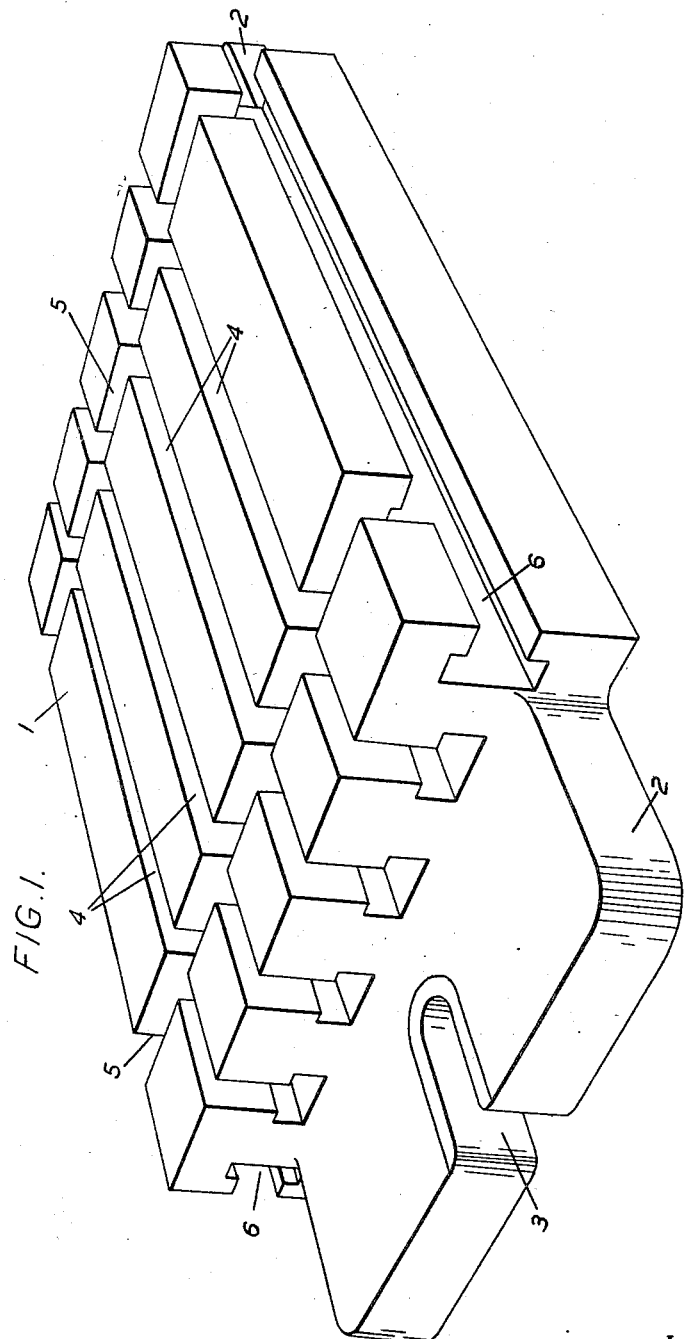

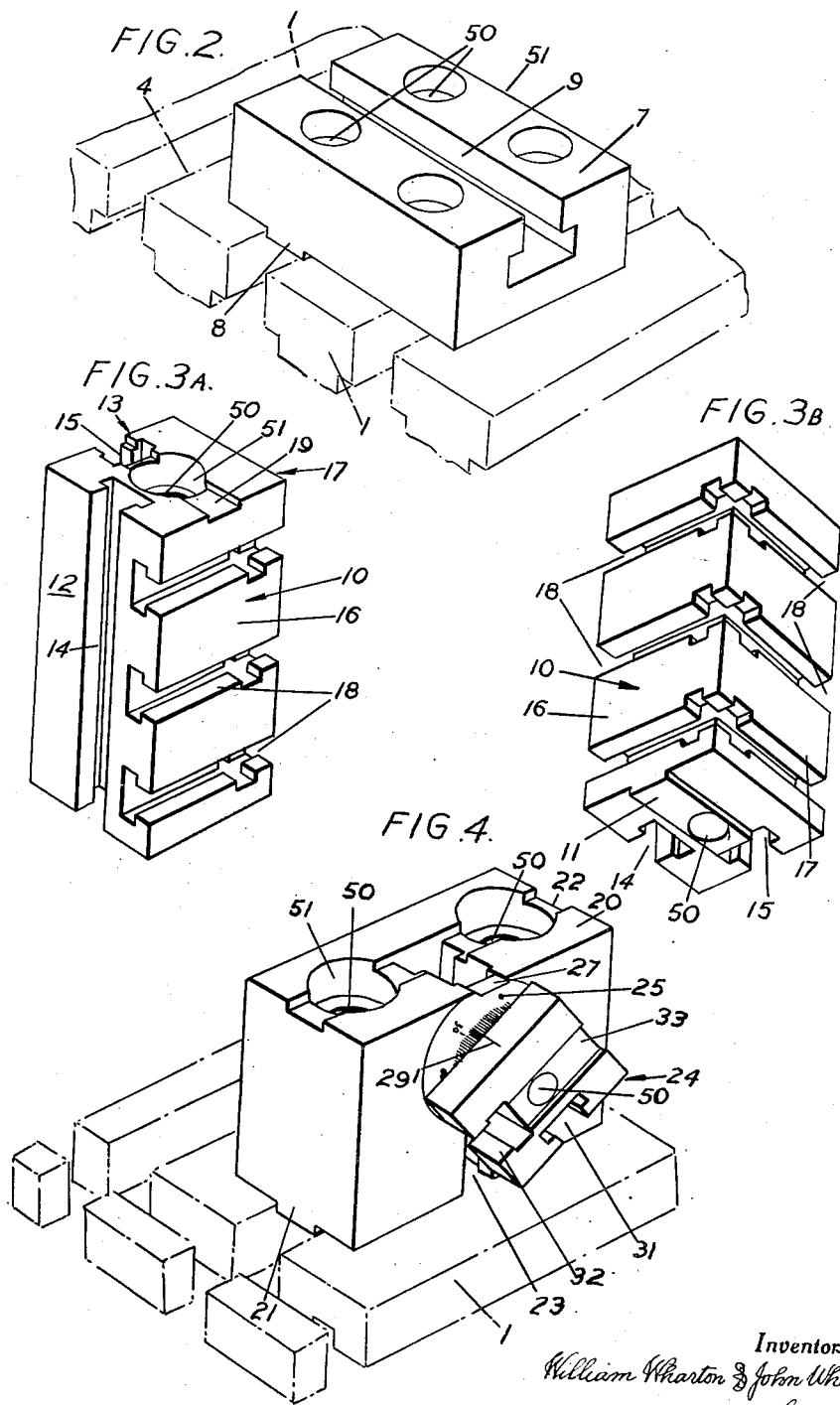

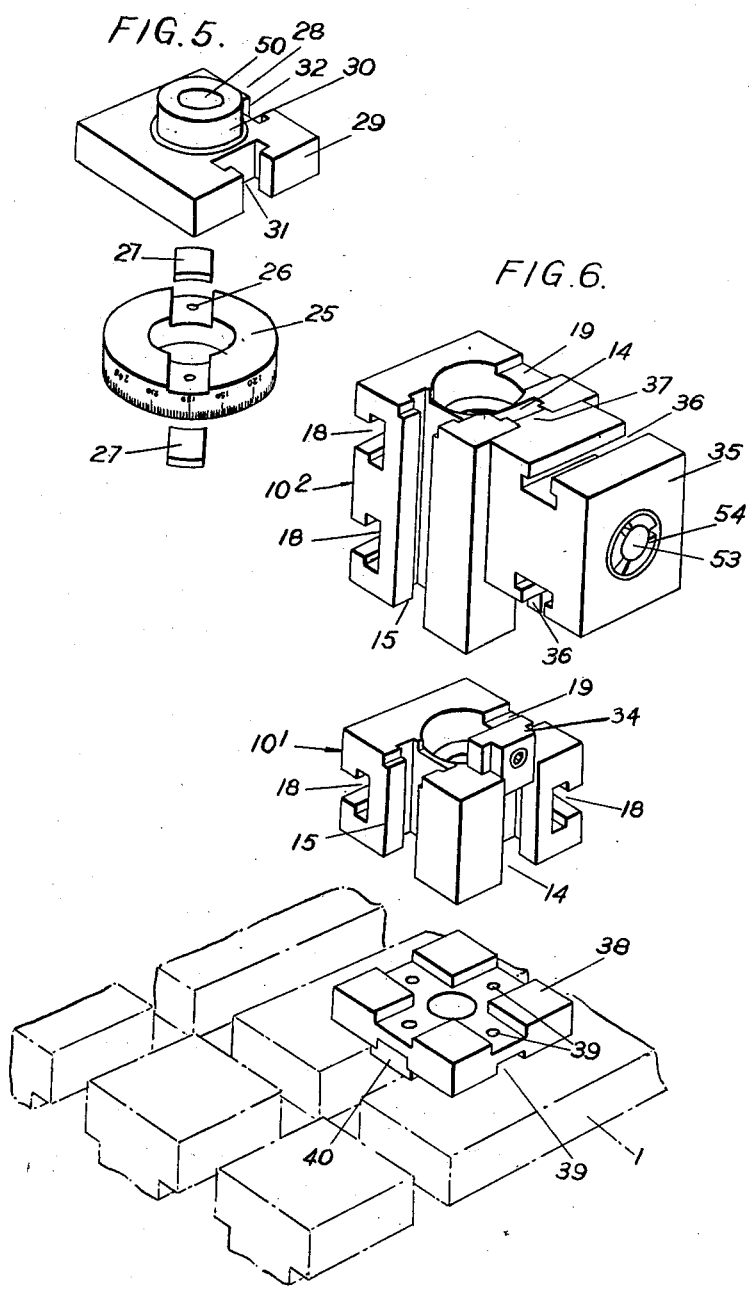

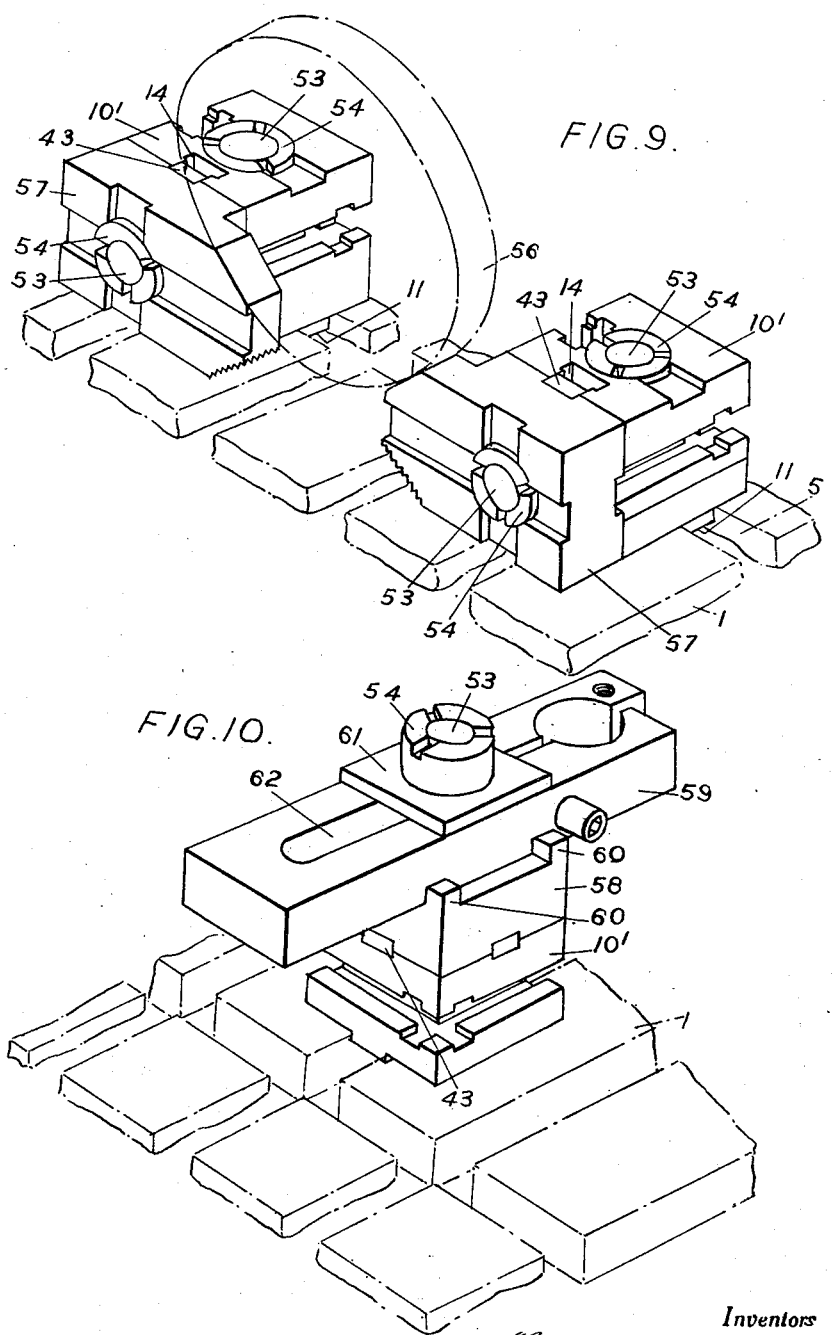

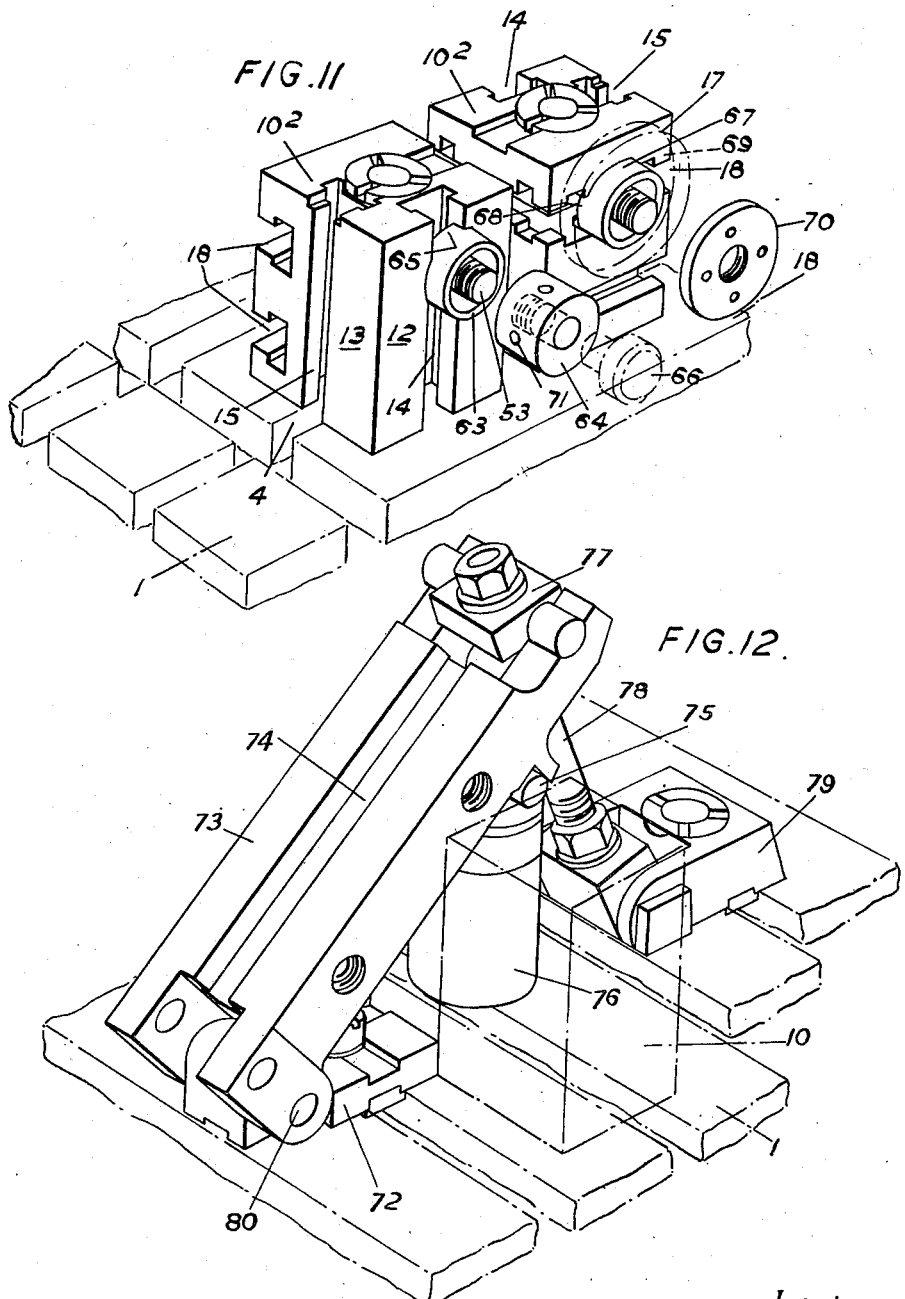

Patented Apr. 27, 1954

2,676,413

UNITED STATES PATENT OFFICE 2,676,413

DESIGN AND CONSTRUCTION OF JIGS AND FIXTURES

William Wharton, Mill Hill, London, and John Wharton, Hendon, London, England

Application December 12, 1950, Serial No. 200,316

Claims priority, application Great Britain November 9, 1943

9 Claims. (Cl. 33—174)

The present invention relates to the design and construction of jigs and fixtures and to the possibility of simplifying the production of components normally manufactured in batches or in small quantities to accurate dimensions necessitating skill in setting up and machining, the object being to reduce the times taken in designing and constructing jig or fixture equipment and subsequent times taken for completing the necessary operations on the components with consequent greater output per machine by the use of semi-skilled labour.

In a method commonly used today for constructing a jig or fixture for the production of a component, a drawing of the component is given to a jig or fixture designer with a list of the planned operations to be effected on said component. From these he proceeds to design the jig which may in some cases take several weeks. When this design has been completed and approved it is passed to a constructor or engineer for the construction of the finished jig which may take several more weeks.

An object of this invention is to eliminate the necessity for the preparation of a design and for the construction of a jig from said design as above described by providing a plurality of interchangeable standard elements by means of which the designer, preferably in conjunction with the constructor or engineer may build up the main framework of jigs of various forms and sizes, said elements being made of materials normally used in the manufacture of jigs and fixtures or formed of any suitable mouldable material either with or without pressure, or die cast.

This early collaboration in a practical form between the designer and the engineer will avoid to a considerable extent delays usually associated with jig production, even in well considered layouts, due to modifications when putting the equipment to work on a machine.

Existing types of jigs in the main consist of a structure designed exclusively for the purpose of holding and locating one particular component to be operated on. This structure may be made as a casting or may be fabricated by welding or built up of a series of small parts dowelled and bolted together. It may have a base and sides or may consist of a plate with supports for mounting it on a machine table. On this main structure may be mounted pads for the location of the component which may be fixed to it by dowels and/or bolts set in the solid structure setting faces in a definite relationship to the face or the faces to be machined. It may also contain means for holding the component rigidly during machining operations.

Jigs and fixtures for holding and/or locating other components in the course of manufacture for the purpose of effecting drilling, machining or other operations or for the inspection of a manufactured article or component are usually formed as single units and are of permanent form which, as will be obvious, become obsolete with a change of product or modification in design of the component, or have to be retained for long periods for the purpose of supplying spare parts, thereby occupying considerable storage space which might be used to better advantage.

Certain built up jigs have, however, been proposed such as, for example, jigs built up from sets of elements comprising base plates, angle plates, V blocks, brackets, bars of various sections, packing pieces, keys and pins, and bushes and the like of various sizes and shapes, and all machine finished so that they may be assembled and secured in true alignment but the design of the separate or unitary elements employed limits the variety of combinations and is not universal in its application.

The interchangeable standard elements according to this invention are furnished with T-slots, tenon slots and tenons formed and arranged to locate and secure the elements relatively to one another and to a base on which they are mounted and secured, the elements and the base being universally adjustable with respect to each other whereby it is possible to assemble them in an unlimited number of ways to build up the main framework of any jig or fixture that is required.

This application is a continuation in part of application #563,414, filed November 14, 1944, and now abandoned.

In the accompanying drawings which illustrate this invention:

Figure 1 is a perspective view of one form of rectangular sub-base on which the various forms of standard elements shown in the subsequent figures may be secured.

Figure 8:
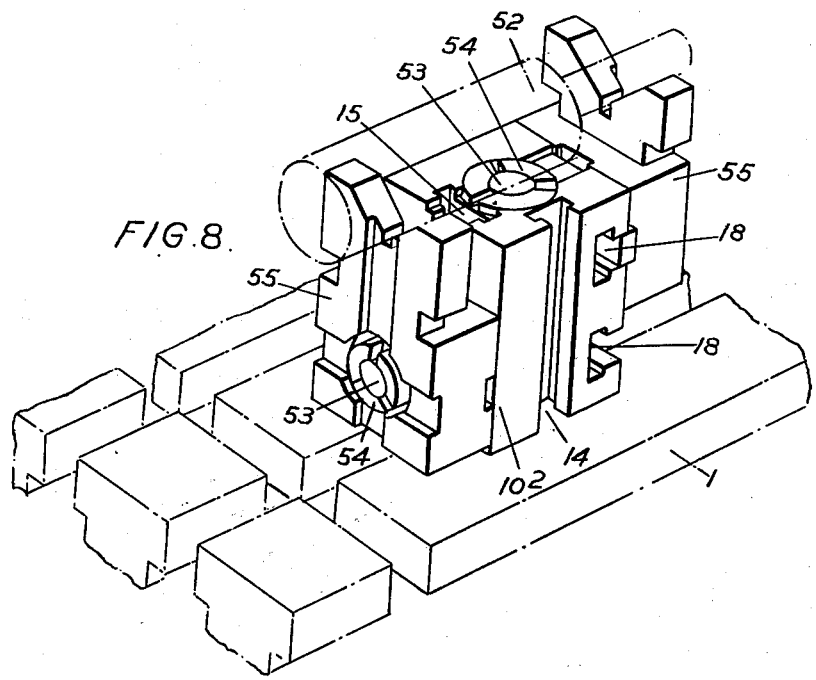

Figure 2 is a perspective view of one form of standard frame element which may be secured to the sub-base shown in Figure 1 and upon which other forms of standard elements may be secured, Figure 3a is a perspective view from above and showing two sides of one form of stop element, Figure 3b is a perspective view from below and showing a further side of the stop element shown in Figure 3a, Figure 4 is a perspective view of a second form of standard frame element with a circular angle setting unit mounted thereon, Figure 5 is a perspective view showing the separate parts of the circular angle setting unit, Figure 6 is an exploded perspective view of an adaptor unit, two other forms of stop elements and a side extension frame element, Figure 7 is a perspective view of two forms of height elements, one being variable, Figure 8 is a perspective view of a simple fixture which can be constructed in accordance with this invention, Figure 9 is a perspective view of a second simple fixture which can be constructed in accordance with this invention, Figure 10 is a perspective view of a third simple fixture which can be constructed in accordance with this invention, Figure 11 is a perspective view of a fourth simple fixture which can be constructed in accordance with this invention, and Figure 12 is a perspective view of a sine-bar unit for providing a surface inclined to that of the sub-base and upon which other forms of standard elements may be secured.

The basic elements of this invention are designed to form the main framework of a jig and to provide reaction points to the forces of a cutting tool or external forces caused by clamping a component in position in the jig. These basic elements are illustrated in Figures 1 to 7 of the drawings and comprise sub-bases, frame elements, stop elements, angle setting units and height elements. While certain dimensions are given hereinafter in connection with these and other elements these dimensions are only given by way of example so that the preferred construction of the elements can be readily understood.

As shown in Figure 1 a sub-base 1 is provided at each end with an extension 2 in which is formed a slot 3 adapted to receive clamping means (not shown) for securing the sub-base on a machine base proper. T-slots 4 are arranged in equally spaced parallel relationship longitudinally across the face of the sub-base, while two further transverse T-slots 5 are arranged at right angles to the T-slots 4, one near each end of the sub-base. Further T-slots 6 are arranged in the vertical sides of the sub-base 1. The T-slots 4, 5, 6 are all $\frac{9}{16}$ of an inch in width, and the pitch of the T-slots 4 is 2 inches.

The standard frame element 7 shown in Figure 2 is of elongated rectangular shape being provided on its under surface with a tenon 8 adapted to be received in any one of the longitudinal T-slots 4 in the sub-base 1. In its upper surface it is provided with a T-slot 9 arranged at right angles to the tenon 8 so that when the tenon 8 is engaged in a T-slot 4 the T-slot 9 is disposed at right angles to the T-slots 4 and parallel to the T-slots 5 in the sub-base. The tenon 8 is a few thousandths of a tenth of an inch less than $\frac{9}{16}$ of an inch in width and the T-slot 9 is $\frac{9}{16}$ of an inch in width.

The stop element 10 shown in Figures 3a and 3b is of elongated shape being 4½ inches in height and square in horizontal cross section or plan view, the side of the square being 2 inches, which is the same as the pitch of the T-slots 4 in the sub-base. On its under surface it is provided with a central tenon 11, equal in width to the tenon 8 on the frame element 7, adapted to be received, for example, in any one of the longitudinal or transverse T-slots 4, 5 in the sub-base 1 or in the T-slot 9 in the frame 7. When two stop elements are disposed side by side in two adjoining T-slots 4 in a sub-base 1 they abut against each other. In two adjacent sides 12, 13 of the stop element there are provided central vertical T-slots 14, 15, $\frac{9}{16}$ of an inch in width, while in the other two adjacent sides 16, 17 there is provided a plurality of horizontal T-slots 18, $\frac{9}{16}$ of an inch in width, arranged in equally spaced parallel relationship. In the upper end of the stop element there is provided a central tenon slot 19, $\frac{9}{16}$ of an inch in width, adapted to receive the tenon 11 on the under surface of a second stop element.

Stop elements are of different sizes. In Figure 6, to which more detailed reference will be made hereinafter, two further stop elements 10¹ and 10² are shown. These are respectively one third and two thirds of the height of the stop element 10 shown in Figures 3a and 3b, having one and two horizontal T-slots 18 in the sides 16 and 17.

The pitch of the T-slots 18, in each element provided with more than one T-slot is 1½ inches. Also the centre of the only or of the lowermost T-slot 18 is ⅝ of an inch from the bottom of the stop element, and the centre of the said only or of the uppermost T-slot 18 is ⅞ of an inch from the top of the stop element so that when two or more stop elements are mounted one on top of each other with tenons 11 engaged in tenon slots 19 the pitch of all the T-slots 18 in the stop elements is still 1½ inches.

In Figure 4 there is shown firstly a second form of standard frame element 20 provided on one side with a tenon 21 equal in width to the tenon 8 on the frame element 7, on the opposite side with a tenon slot 22, and in one long side joining said two sides with a T-slot 23, the tenon slot 22 and T-slot 23 both being $\frac{9}{16}$ of an inch in width. This frame element may be positioned as shown on a sub-base 1 with its tenon 21 engaged in one of the longitudinal T-slots 4, or in one of the transverse T-slots 5. Furthermore by engaging the tenon 21 in one of the T-slots 6 in the side of the sub-base the frame element 20 may be used to provide a local extension of the sub-base.

Also shown in Figure 4 is a circular angle setting unit 24, the two parts of which are shown separately in Figure 5. One part 25 is in the form of a circular ring graduated on its outer edge from 0–360° and provided on its under surface with a tenon slot 26, $\frac{9}{16}$ of an inch in width for the reception of two separate tenons 27 adapted to locate it in any of the T-slots in the sub-base 1, the frame elements 7, 20 or the stop elements 10, 10¹, 10² the tenons being as previously a few thousandths of a tenth of an inch less than $\frac{9}{16}$ of an inch. The other part 28 comprises a block 29 of square cross section having on one side a central tubular boss 30 adapted to receive the ring like part 25. The block 29 is identical with an end portion of a stop element 10, being provided in two sides with T-slots 31, 32 (corresponding to the T-slots 14, 15 in a stop element 10) and in its outer end with a tenon slot 33, $\frac{9}{16}$ of an inch in width, adapted to receive the tenon 11 on the under surface of a stop element. A setting point 29¹ is marked on one edge of the block 29.

In Figure 6 there are shown the stop elements 10¹ and 10² to which reference has already been made, and to assist in holding these two elements rigidly together when mounted one on top of the other there is provided an interlocking T-shaped tenon 34 adapted to be engaged in the adjoining end portions of the vertical T-slots 14 or 15. Also shown in Figure 6 is a side extension frame 35 having in two opposite sides T-slots 36, $\frac{9}{16}$ of an inch in width, and in a third side, disposed in a plane at right angles to said T-slots, with a tenon 37 adapted to be engaged in any of the tenon or T-slots in the several elements above described, the tenon 37 being equal in width to the tenon 8 on the frame 7.

Finally in Figure 6 there is also shown an adaptor unit or element 38, of square shape in horizontal cross section, having two tenon slots 39 disposed at right angles to each other in its upper and lower faces the tension slots in one face being $\frac{9}{16}$ of an inch in width and the tenon slots in the other face being $\frac{7}{16}$ of an inch in width. The adaptor unit is located and held, for example on a sub-base 1, by means of two separate tenons 40 adapted to engage in any of the T-slots in said sub-base. As shown the tenons 40 may be stepped so that they may be engaged in the $\frac{9}{16}$ of an inch T-slots 4 and a $\frac{7}{16}$ of an inch tenon slot on one face of the adaptor unit.

In Figure 7 there are shown two forms of height elements. The height element 41 is of elongated rectangular shape being 1½ inches in width and having in its upper and lower faces two tenon slots 42, $\frac{7}{16}$ of an inch in width, disposed at right angles to each other. The height element 41 is located and held, for example on a sub-base 1 by two separate stepped tenons 40.

The height element 44 comprises two parts 45, 46 arranged to slide relatively to each other on inclined planes, a vernier scale 47 being provided on their adjoining side walls to enable slight adjustments of height to be accurately effected and measured. The part 45 is adapted to seat and to be secured on a base 48 which is provided in its lower face with tenon slots $\frac{7}{16}$ of an inch in width disposed at right angles to each other to enable this part to be located and held, for example on a height element 41 as shown, by separate plain tenons 43.

A plurality of height elements such as the element 41 is provided, the vertical dimensions of such elements varying so that in conjunction with the variable height element 44 it is possible to build up a column of height elements to any desired height. It will be noted than the width of the height elements 41 is equal to the pitch of the T-slots 18 in the stop elements so that when two height elements are located side by side by separate tenons in two adjacent T-slots 18 they will abut against each other.

The separate tenons hereinbefore referred to may, as indicated, be stepped or plain and the widths thereof are a few thousandths of a tenth of an inch less than either $\frac{9}{16}$ or $\frac{7}{16}$ of an inch as the case may be.

It will be appreciated that the basic elements hereinbefore described are all machined to a very great degree of accuracy so that they can be interengaged without any lateral play. A tolerance of three tenths of a thousandth of an inch has proved suitable.

The frame elements 7, 20, the stop elements 10, 10¹, 10², the circular angle setting unit 24, the adaptor unit 38, the side extension element 35 and the height elements 41, 44 are all provided with holes 50 through which T-bolts or the like 53 may be passed for rigidly securing assembled elements together, the elements being recessed, as for example at 51 in Figure 3a, to receive securing nuts 54 and the head of said T-bolts or the like being engaged in the T-slots of said elements. The $\frac{9}{16}$ of an inch T-slots are intended to receive heavier T bolts than the $\frac{7}{16}$ of an inch T-slots.

It will be understood that, whereas single elements have been described, in practice a plurality of each of the different elements may be employed. Sub-bases may be of varying sizes and may be rectangular, as shown in Figure 1, or circular. Using the various elements it is possible to build up on any sub-base the main framework of any jig or fixture that may be required since the adjustability of the elements with respect to each other is completely universal.

When assembled a jig or fixture can be moved to the machine in conjunction with which it is to be used, it being unnecessary to immobilise the machine while the jig or fixture is being built up on the machine base itself. After use the jig or fixture can be readily dismantled and the elements made available for constructing other jigs or fixtures.

Examples of simple fixtures which can be built up using the basic elements hereinbefore described are shown in Figures 8, 9, 10 and 11.

The fixture shown in Figure 8 is designed for holding a component 52 having a stepped axis and comprises a stop element 10² mounted on and secured to a sub-base 1, the securing bolt and nut being shown at 53 and 54 respectively. Special V blocks 55, which are similar to the adaptor unit 38 in that they are provided with cross tenon slots of different widths in each face disposed at right angles to each other, are tenoned to this stop element, one by means of separate tenons 43 engaging in the upper of the horizontal T-slots 18 in one side of the stop element and the other by means of separate tenons (not shown) engaging in the vertical T-slot 15 in the opposite side of the element. It will be understood that the latter V block can easily be adjusted in a vertical direction until it is at the required height relative to the other V block. The V blocks are finally rigidly secured in position by T-bolts 53 and securing nuts 54. In the case of a component with a parallel axis the V blocks can be disposed at the same height.

The fixture shown in Figure 9 is designed for supporting a large circular component 56 and comprises two stop elements 10¹ mounted in spaced relationship in either a longitudinal or transverse T-slot 4, 5 respectively on a sub-base 1. To each stop element is secured in the manner above described a special half V block 57, provided with cross tenon slots of different widths as before the latter being tenoned to its stop element by means of separate tenons 43 engaging in the vertical T-slot 14. It will be noted that one side of the half V blocks is plain and the other serrated. The stop elements may be moved towards or away from each other according to the diameter of the component 56.

The fixture shown in Figure 10 is designed for use in drilling operations on a component, and comprises a stop element 10¹, mounted on a sub-base, to the upper end of which is tenoned by means of separate tenons 43 a block 58 for adjustably supporting a clamping member 59, the latter sliding between lugs 60 provided at each corner of the block 58. The clamping member 59 is locked in position by means of a T bolt 53 and locking nut 54 the latter being arranged to exert pressure on a clamping plate 61. The clamping member 59 is provided with an elongated slot 62 to allow it the required endwise sliding movement.

The fixture shown in Figure 11 is designed for supporting specially made members adapted to be inserted in the internal bore or bores of a component. Two stop elements 10² are mounted in the same longitudinal T-slot 4 on a sub-base 1 so that the side 12 of one element, with the vertical T-slot 14, is flush with the side 17 of the other element, with the horizontal T-slots 18. A locating element is mounted in the said vertical T-slot 14, this element comprising an inner part 63 and an outer part 64, the said inner part being provided with a tenon 65 for insertion in the T-slot 14 and the said outer part 64 being internally screw threaded at its inner end to receive the outer end of a securing T bolt 53 passing through the inner part 63. Internally the outer part 64 tapers towards its outer end and is adapted to receive a member 66 which is specially made to fit an internal bore of a component into which it is to be inserted.

A second locating element is mounted in the upper of said horizontal T-slots 18, this element comprising an inner part 67 which is similar to the inner part 63 of the first locating element except that its tenon 68 is machined to fit into the horizontal T-slot 18. This inner part 67 is adapted to support a member 69 in the form of a ring made, for example, of soft steel which is also specially made to fit an internal bore of a component into which it is to be inserted. The ring member 69 is held in position by means of a flanged nut 70 screwed onto the end of a securing T bolt 53 passing through the inner part 67.

The outer part 64 of one element and the flanged nut 70 are both provided with recesses or the like 71 for cooperation with a tightening spanner or like tool.

The stop elements 10² are adjustable towards and away from each other along the longitudinal T-slot 4, one locating element is adjustable vertically in the T-slot 14 and the other locating element is adjustable horizontally in the T-slot 18. It will therefore be appreciated that this fixture allows of ready adjustment to accommodate any component.

Figure 12 shows a sine bar unit which may be used for providing a surface inclined to that of a sub-base 1 and upon which other elements may be mounted. This sine bar unit comprises a base block 72 tenoned into any of the T-slots of a sub-base 1 and secured by means of a T bolt and locking nut. To this block 72 is hinged a bar 73 provided in its upper surface with a T-slot 74 for the reception of other elements and on its under surface with a cylindrical bar 75 adapted to rest on the top of a pillar 76, which may be constructed of height elements such as those described with reference to Figure 7 or from cylindrical elements as shown. The bar 75 is clamped at the required angle by a clamp 77 through which passes a stud 78 hingedly carried by a block 79 also tenoned into and secured in a T-slot in the sub-base. Stop elements 10, 10¹, 10² may be used to brace the structure.

In making the sine bar unit the distance between the centre of the pivot pin 80 of the bar 73 and the centre of the bar 75 is accurately determined so that the height of the pillar 76 required to support the bar at any particular angle can readily be calculated.

We claim:

1. A stop element for use in designing and constructing the main framework of a jig or fixture to position a work piece above a base having a flat upper face with a plurality of equally spaced parallel T-slots extending lengthwise in the upper face of the base, which comprises a rectangular block having a square horizontal cross-section, each side of which square cross-section is equal in length to the pitch of the longitudinal T-slots in the upper face of the base, a tenon on the under surface of the block, a tenon slot in the upper surface of the block, a central vertical T-slot in each of two adjacent sides of the block and a horizontal T-slot in each of the other two adjacent sides of the block.

2. A stop element for use in designing and constructing the main framework of a jig or fixture to position a work piece above a base having a flat upper face with a plurality of equally spaced parallel T-slots extending lengthwise in the upper face of the base, which comprises a rectangular block having a square horizontal cross-section, each side of which square cross-section is equal in length to the pitch of the longitudinal T-slots in the upper face of the base, a tenon on the under surface of the block, a tenon slot in the upper surface of the block, a central vertical T-slot in each of two adjacent sides of the block, and a plurality of equally spaced horizontal T-slots in each of the other two adjacent sides of the block.

3. A set of elements for use in designing and constructing the main framework of a jig or fixture which comprises a base having a flat upper face with a plurality of equally spaced parallel T-slots extending lengthwise in the upper face of the base; means for positioning a work piece above the base, which means includes a stop element comprising a rectangular block having a square horizontal cross-section, each side of which square cross-section is equal in length to the pitch of the longitudinal T-slots in the upper face of the base, a tenon on the under surface of the block, a tenon slot in the upper surface of the block, a central vertical T-slot in each of two adjacent sides of the block and a horizontal T-slot in each of the other two adjacent sides of the block; and means for securing the tenon on the under surface of the stop element relative to one of the T-slots in the base, wherein a plurality of said stop elements abutted vertically, transversely and longitudinally above the base provide vertical faces having a plurality of parallel equally spaced T-slots therein.

4. A set of elements according to claim 3 in which the means for securing the stop element above the base includes a frame element of rectangular horizontal cross-section having on its under surface a tenon for engagement in one of the T-slots in the base and having a T-slot in its upper face disposed at right angles to said tenon for engaging the tenon on the under surface of the stop element.

5. A set of elements according to claim 3 in which the means for positioning a work piece above the base further comprises a height element formed of a rectangular block having two tenon slots disposed at right angles to each other in the lower surface of the height element and two tenon slots disposed at right angles to each other in the upper surface of the height element, and means for securing a tenon slot in the under surface of said height element relative to one of the T-slots in said base and said stop element.

6. A set of elements according to claim 3 in which the means for positioning a work piece above the base further includes an angle setting unit for angularly mounting other elements of the set formed of a circular ring having a tenon slot in its under surface and of a block of square cross-section having a central tubular boss rotatably mounted in the ring, a tenon slot in its outer end and a central vertical T-slot in each of two adjacent sides.

7. A set of elements for use in designing and constructing the main framework of a jig or fixture which comprises a base having a flat upper face with a plurality of equally spaced parallel T-slots extending lengthwise in the upper face of the base; means for positioning a work piece above the base, which means includes a stop element comprising a rectangular block having a square horizontal cross-section, each side of which square cross-section is equal in length to the pitch of the longitudinal T-slots in the upper face of the base, a tenon on the under surface of the block, a tenon slot in the upper surface of the block, a central vertical T-slot in each of two adjacent sides of the block and a horizontal T-slot in each of the other two adjacent sides of the block, a height element formed of a rectangular block having two tenon slots disposed at right angles to each other in the lower surface of the height element and two tenon slots disposed at right angles to each other in the upper surface of the height element, and an angle setting unit for angularly mounting other elements of the set formed of a circular ring having a tenon slot in its under surface and of a block of square cross-section having a central tubular boss rotatably mounted in the ring, a tenon slot in its outer end and a central vertical T-slot in each of two adjacent sides; and means for securing said elements above the base, which means includes a frame element of rectangular horizontal cross-section having on its under surface a tenon for engagement in one of the T-slots in the base and having a T-slot in its upper face disposed at right angles to said tenon for engaging the tenon on the under surface of the stop element, and means for securing a tenon slot in the under surface of said height element relative to one of the T-slots in said base and said stop element, wherein a plurality of said stop elements abutted vertically, transversely and longitudinally above the base provide vertical faces having a plurality of parallel equally spaced T-slots therein.

8. A set of elements according to claim 3 in which the base is further provided with two transverse T-slots in the upper face arranged at right angles to the longitudinal T-slots, said transverse T-slots being disposed one near each end of the base, and a T-slot extending lengthwise in each longitudinal vertical side of the base.

9. A set of elements according to claim 3 wherein the stop element has a plurality of equally spaced horizontal T-slots in each of the two adjacent sides opposite the sides having a vertical T-slot therein, and wherein the means for positioning a work piece above the base further comprises a height element formed of a rectangular block having a width equal to the pitch of said horizontal T-slots in said stop element, two tenon slots disposed at right angles to each other in the lower surface of the height element and two tenon slots disposed at right angles to each other in the upper surface of the height element, and means for securing a tenon slot in the under surface of said height element relative to one of the T-slots in said base and said stop element.

References Cited in the file of this patent

UNITED STATES PATENTS

| Number | Name | Date |
|---|---|---|
| 551,777 | List | Dec. 24, 1895 |
| 1,092,591 | Pageau | Apr. 1, 1914 |
| 1,209,667 | Buhr | Dec. 26, 1916 |
| 1,396,165 | Cory | Nov. 8, 1921 |
| 1,420,321 | Klausmeyer | June 20, 1922 |
| 1,902,136 | Mills | Mar. 21, 1933 |
| 1,935,542 | Bursell | Nov. 14, 1933 |
| 2,141,751 | Hertlein | Dec. 27, 1938 |
| 2,205,799 | McMenamin | June 25, 1940 |
| 2,349,087 | Fraser | May 16, 1944 |
| 2,356,300 | Boettcher | Aug. 22, 1944 |
| 2,369,425 | Becker | Feb. 13, 1945 |
| 2,429,893 | Parks et al. | Oct. 28, 1947 |
| 2,430,613 | Hodge | Nov. 11, 1947 |
| 2,460,330 | Baccaro | Feb. 1, 1949 |
| 2,536,937 | Hosea | Jan. 2, 1951 |

FOREIGN PATENTS

| Number | Country | Date |
|---|---|---|
| 403,228 | Great Britain | Dec. 21, 1933 |

OTHER REFERENCES

American Machinist, pages 910–912, September 17, 1941, vol. 8.5, #9.